B. H. NOELTING.
CASTER.
APPLICATION FILED JUNE 24, 1912.
1,111,085.
Patented Sept. 22, 1914.
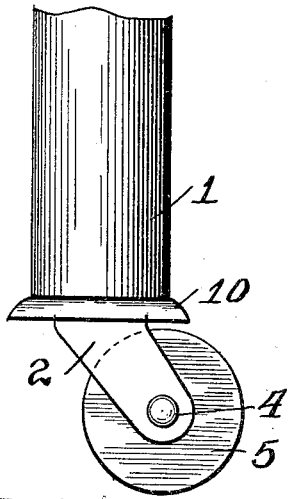
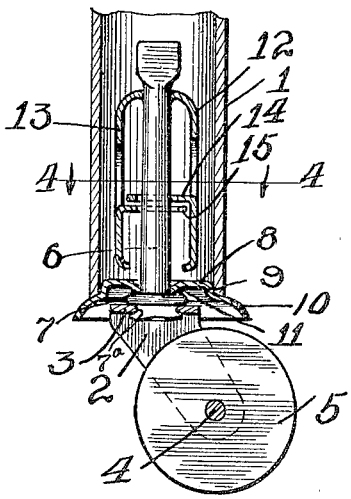
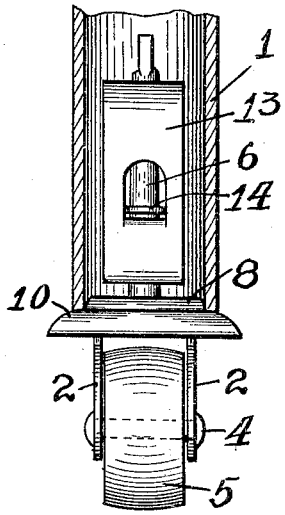
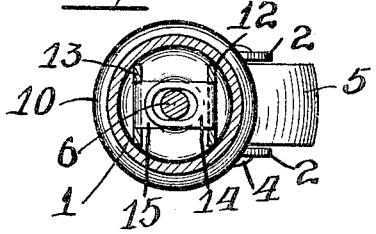
Witnesses
J. W. Angell
Charles W. Tilly Jr.
Inventor
Bernhard H. Noelting
by Charles W. Tilly
Atty.

UNITED STATES PATENT OFFICE.

BERNHARD H. NOELTING, OF NEBRASKA CITY, NEBRASKA, ASSIGNOR TO FAULTLESS CASTER COMPANY, A CORPORATION OF NEBRASKA.

CASTER.

1,111,085.  Specification of Letters Patent.  Patented Sept. 22, 1914.

Application filed June 24, 1912. Serial No. 705,427.

*To all whom it may concern:*

Be it known that I, BERNARD H. NOELTING, a citizen of the United States, and a resident of the city of Nebraska City, in the county of Otoe and State of Nebraska, have invented certain new and useful Improvements in Casters; and I do hereby declare that the following is a full, clear, and exact description of the same, reference being had to the accompanying drawings, and to the numbers of reference marked thereon, which form a part of this specification.

This invention relates to improvements in casters, and more particularly to improvements in casters designed for use in connection with furniture or the like, provided with tubular legs. Casters as heretofore devised for this purpose, have frequently been unnecessarily complicated, and, in some instances, have been so constructed as to permit the jamming of the caster in the tubular leg or socket member therefor, thereby acting to prevent the caster swiveling when in operation, and, as a result, injuring, if not destroying the caster. Sometimes this is occasioned because of the large frictional bearing face on the saddle or track plate of the saddle, and upon which the load is supported, and beneath which the saddle should swivel or turn. In other constructions, the means for engaging the pintle of the caster in the tubular leg have proven inefficient, so that with a short period of use, the caster may fall out, if the leg to which the caster is secured, be slightly raised.

It is the object of this invention to afford a construction adapted to very positively engage the pintle of the caster from lateral movement in the mount therefor within the leg, but permitting the utmost freedom of rotation for the pintle within the mount.

It is also an object of the invention to afford a construction wherein the frictional bearing or contact faces of the track plate on the saddle and the corresponding portion of the mount, are so arranged and related as to reduce the friction occasioned by the turning of the saddle and pintle relatively to the leg, to a minimum.

It is an object of the invention also to afford an improved bottom mount for metal beds and the like, in connection with improved means for securing the pintle within the leg.

The invention embraces many novel features, and, in its preferred form, is illustrated in the drawings and hereinafter more fully described.

In the drawings: Figure 1 is a side elevation broken away, of the tubular leg of a metal bedstead equipped with a caster embodying my invention. Fig. 2 is a central vertical section taken through the bed leg and pintle mount. Fig. 3 is a similar section taken at a right angle with that in Fig. 2. Fig. 4 is a sectional view on line 4—4 of Fig. 2.

As shown in the drawings: 1, indicates the tubular leg of an article of furniture, for example, a metal bed.

2, indicates the bracket arms integral with the saddle 3, of the caster. Rotatably secured upon a pin 4, extending through the outer ends of the arms or brackets 2, of the saddle, is the caster wheel 5. Extending upwardly through, and secured at the middle of the saddle, is a pintle 6, shown as cylindric, and which is rigidly secured to the saddle by riveting or otherwise. Concentric with the pintle, and, if desired, integral therewith, is a raised bead or rim 7, which flanges over the saddle concentric with the pintle, and at the upper side of the saddle, which is engaged in the groove $7^a$ affords what may be termed a "track plate" which is of relatively small diameter. The caster wheel is offset from the pintle 6, as is usual in such constructions.

Mounted upon the pintle or standard 6, is a bottom mount 8, comprising a washer of pressed steel or other suitable material, concave on its under side and convex on its upper end, as shown, pressed up concentric with the pintle to afford a raised, peripheral, outwardly facing shoulder 9, adapted to fit within the lower open end of the leg of the furniture, and integral with a downwardly and convexly curving lip 10, which projects well beyond the tubular leg 1, and affords an ornamental finish as well as a support for the leg which rests directly thereon. At its center, said bottom mount is, of course, apertured to receive the pintle or standard 6, therethrough, and is struck downwardly to afford a peripheral downwardly extending flange 11, which bears upon the bead 7, closely adjacent to, and around the pintle, thus serving as a bottom guide for the pintle 6, and serving as well to deliver the superposed weight to the track plate and caster wheel. Said pintle is also centered and rotatably engaged in the tubular leg by means of a resilient centralizing and engaging device, comprising a strap of resilient metal such as steel, stamped and shaped to afford a U shaped body or yoke, having a central aperture therethrough to receive the upper end of the pintle and affording downwardly directed spring arms 12 and 13, which are of a length to extend to near the bottom mount, and at their lower ends are slightly inturned toward, but not to the pintle. Integral tongues 14 and 15, respectively, are struck inwardly from said arms 12 and 13, respectively, and overlap, as shown in Figs. 2 and 4, and are provided with slotted apertures therethrough through which the pintle 6, extends.

When the caster, bottom mount and pintle mount are assembled together, the parts are maintained in assembled relation by deforming the upper end of the pintle sufficiently to prevent the withdrawal of the pintle through the apertures therefor in the pintle mount. The edges of the yoke arms 12 and 13, are left relatively sharp, so that, when the pintle with said pintle mount is pressed into the tubular leg of the article of furniture with which the same is to be used, said edges bite into the metal forming said leg, thereby serving to hold the same from withdrawal, and this engagement is made the more positive because of the resiliency of the pintle mount, which (and owing to the slotted apertures in said tongues) permits a considerable degree of expansion of the pintle mount when released from the leg.

It is not important whether or not the pintle mount engages upon the bottom mount when the caster is in operation, inasmuch as the raised portion afforded in said bottom mount, fits within the end of the tubular leg, and acts in conjunction with the pintle mount to center the caster pintle therein. It is to be understood that one or more of said apertured tongues may be employed, as the occasion may require, said tongues serving only to assist in holding said pintle in a centralized position within the leg, and serving to hold the yoke arms 12 and 13, from undue divergence when the device is not in use.

Of course, it is to be understood that details of the construction may be varied. I have shown but one (and that a preferred) form of construction. I therefore do not purpose limiting the patent granted on this application for patent otherwise than necessitated by the prior art.

I claim as my invention:

A pintle mount of the class described embracing a strap of spring metal stamped to U shape, and affording substantially parallel integral arms, said strap having a pintle aperture through the middle thereof to receive the upper end of the pintle therethrough, and inwardly struck, longitudinally slotted tongues integral with said arms at points above the lower ends thereof, and arranged in overlapping relation, and through which said pintle also passes.

In testimony whereof I have hereunto subscribed my name in the presence of two subscribing witnesses.

BERNHARD H. NOELTING.

Witnesses.
H. D. WILSON,
GEO. W. SLACK.